United States Patent
Baskin

(10) Patent No.: US 11,225,324 B2
(45) Date of Patent: Jan. 18, 2022

(54) DUAL FLEX-BEAM ASSEMBLY FOR FOLDING ROTOR BLADE

(71) Applicant: LOCKHEED MARTIN CORPORATION, Bethesda, MD (US)

(72) Inventor: Bryan Kenneth Baskin, Arlington, TX (US)

(73) Assignee: LOCKHEED MARTIN CORPORATION, Bethesda, MD (US)

(*) Notice: Subject to any disclaimer, the term of this patent is extended or adjusted under 35 U.S.C. 154(b) by 287 days.

(21) Appl. No.: 16/414,882

(22) Filed: May 17, 2019

(65) Prior Publication Data

US 2020/0361599 A1 Nov. 19, 2020

(51) Int. Cl.
*B64C 27/33* (2006.01)
*B64C 27/37* (2006.01)
*B64C 27/06* (2006.01)
*B64C 27/50* (2006.01)

(52) U.S. Cl.
CPC .............. *B64C 27/33* (2013.01); *B64C 27/06* (2013.01); *B64C 27/37* (2013.01); *B64C 27/50* (2013.01)

(58) Field of Classification Search
CPC ......... B64C 27/06; B64C 27/08; B64C 27/46; B64C 27/33; B64C 27/32; B64C 27/37; B64C 27/39; B64C 27/50; B64C 27/48; B64C 11/16; B64C 11/20; B64C 11/28; B64C 27/473
See application file for complete search history.

(56) References Cited

U.S. PATENT DOCUMENTS

| | | | |
|---|---|---|---|
| 4,111,605 A * | 9/1978 | Roman | B64C 27/33 416/138 |
| 4,466,774 A * | 8/1984 | Cycon | B64C 27/33 416/134 A |
| 5,047,106 A | 9/1991 | Matsumoto et al. | |
| 7,695,249 B2 | 4/2010 | Krauss et al. | |
| 2008/0131280 A1* | 6/2008 | Krauss | B64C 27/50 416/131 |
| 2013/0064674 A1* | 3/2013 | Hunter | B64C 27/473 416/226 |
| 2017/0121018 A1* | 5/2017 | Hunter | B64C 27/33 |
| 2017/0137121 A1* | 5/2017 | Nussenblatt | B64C 27/48 |
| 2017/0217564 A1* | 8/2017 | Nussenblatt | B64C 11/20 |

* cited by examiner

*Primary Examiner* — Joshua J Michener
*Assistant Examiner* — Cindi M Curry
(74) *Attorney, Agent, or Firm* — Foley & Lardner LLP

(57) ABSTRACT

A rotor blade for a rotary wing aircraft includes a rotor hub including a first flex-beam attachment member and a flex-beam assembly. The flex-beam assembly includes a flex-beam support member having an attachment end and a wrapping end. A first flex-beam includes a first end, a second end and an intermediate portion. The first end of the first flex-beam is connected at the first flex-beam attachment member and the second end of the first flex-beam being connected to the attachment end of the flex-beam support member. A second flex-beam includes first end portion, a second end portion and an intermediate section. The first end portion of the second flex-beam is connected at the first flex-beam attachment member, the second end portion of the second flex-beam being connected at the second flex-beam attachment member and the intermediate section extending about the wrapping end of the flex-beam support member.

15 Claims, 4 Drawing Sheets

DUAL FLEX-BEAM ASSEMBLY FOR FOLDING ROTOR BLADE

BACKGROUND

The subject matter disclosed herein generally relates to the art of rotary wing aircraft and, more particularly, to a dual flex-beam assembly for a folding rotor blade.

In typical flex-beam helicopter rotors, a flex-beam extends from a hub member and is connected to a torque tube and blade via a bolted joint at, for example, midspan of the rotor. The joint comprises a pattern of two or more fasteners. In some rotors four or six fasteners, such as bolts, extend through the torque tube, rotor blade and flex-beam at the midspan. The joint is utilized to restrict relative motion of the torque tube, rotor blade and flex-beam. The joint also provides a load path for loads acting on the rotor blade to be transmitted to the flex-beam and then into the hub member. For a folding rotor, a hinge may be arranged at a point inboard from the midspan. The point inboard from the midspan may not provide enough area or length to support a flex-beam that will provide desired stiffness characteristics.

BRIEF DESCRIPTION

According to an embodiment, a rotor blade for a rotary wing aircraft includes a rotor hub including a first flex-beam attachment member and a second flex-beam attachment member, a rotor blade member which generates lift for the rotor blade, and a flex-beam assembly supporting the rotor blade and connected to the rotor hub. The flex-beam assembly includes a flex-beam support member spaced from the rotor hub and having an attachment end and a wrapping end. The rotor blade member is rotatably attached to and extends from the flex-beam support member. A first flex-beam includes a first end, a second end and an intermediate portion. The first end of the first flex-beam is connected at the first flex-beam attachment member and the second end of the first flex-beam being connected to the attachment end of the flex-beam support member. A second flex-beam includes first end portion, a second end portion and an intermediate section. The first end portion of the second flex-beam is connected at the first flex-beam attachment member, the second end portion of the second flex-beam being connected at the second flex-beam attachment member and the intermediate section extending about the wrapping end of the flex-beam support member.

In addition to one or more of the features described above, or as an alternative, in further embodiments a third flex-beam includes a first end section, a second end section and an intermediate segment, the first end section of the third flex-beam being connected at the second flex-beam attachment member and the second end section of the third flex-beam being connected at the attachment end of the flex-beam support.

In addition to one or more of the features described above, or as an alternative, in further embodiments the first flex-beam defines a inner beam and the second flex-beam defines an outer beam.

In addition to one or more of the features described above, or as an alternative, in further embodiments the first flex-beam is connected to the flex-beam support member with at least one fastener.

In addition to one or more of the features described above, or as an alternative, in further embodiments the flex-beam support member defines a hinge end having an opening between the attachment end and a wrapping end, the rotor blade member being attached to the hinged end.

In addition to one or more of the features described above, or as an alternative, in further embodiments a torque tube mounted to the at least one of the first and second flex-beams.

In addition to one or more of the features described above, or as an alternative, in further embodiments the torque tube includes a pivoting blade member arranged at the hinge end.

In accordance with another aspect of an exemplary embodiment, a rotary wing aircraft includes a fuselage, at least one prime mover supported in the fuselage, and a rotor assembly operatively connected to the at least one prime mover. The rotor assembly includes a rotor hub having a first flex-beam attachment member, a second flex-beam attachment member, and a rotor blade mounted to the rotor hub. The rotor blade includes a flex-beam assembly supporting the rotor blade and connected to the rotor hub. The flex-beam assembly includes a flex-beam support member spaced from the rotor hub and having an attachment end and a wrapping end, the rotor blade member rotatably attached to and extending from the flex-beam support member. A first flex-beam includes a first end, a second end and an intermediate portion, the first end being connected at the first flex-beam attachment member and the second end being connected to the attachment end of the flex-beam support member. A second flex-beam includes first end portion, a second end portion and an intermediate section. The first end portion being connected at the first flex-beam attachment member, the second end portions being connected at the second flex-beam attachment member and the intermediate section extending about the wrapping end of the flex-beam support member.

In addition to one or more of the features described above, or as an alternative, in further embodiments a third flex-beam includes a first end section, a second end section and an intermediate segment, the first end section being connected at the second flex-beam attachment member and the second end section being connected at the attachment end of the flex-beam support.

In addition to one or more of the features described above, or as an alternative, in further embodiments the first flex-beam defines an inner beam and the second flex-beam defines an outer beam.

In addition to one or more of the features described above, or as an alternative, in further embodiments wherein the first flex-beam is connected to the flex-beam support member with at least one fastener.

In addition to one or more of the features described above, or as an alternative, in further embodiments the cantilevered end defines a hinge end having an opening between the attachment end and a wrapping end, the rotor blade member being attached to the hinged end.

In addition to one or more of the features described above, or as an alternative, in further embodiments a torque tube extending about the flex-beam assembly.

In addition to one or more of the features described above, or as an alternative, in further embodiments the rotor blade is connected to the torque tube, the rotor blade being configured to pivot about the hinge end.

In addition to one or more of the features described above, or as an alternative, in further embodiments . . . .

The foregoing features and elements may be combined in various combinations without exclusivity, unless expressly indicated otherwise. These features and elements as well as the operation thereof will become more apparent in light of the following description and the accompanying drawings.

However, it should be understood that the following description and drawings are intended to be exemplary in nature and non-limiting.

BRIEF DESCRIPTION OF DRAWINGS

The following descriptions should not be considered limiting in any way. With reference to the accompanying drawings, like elements are numbered alike.

DETAILED DESCRIPTION

Figure 1:
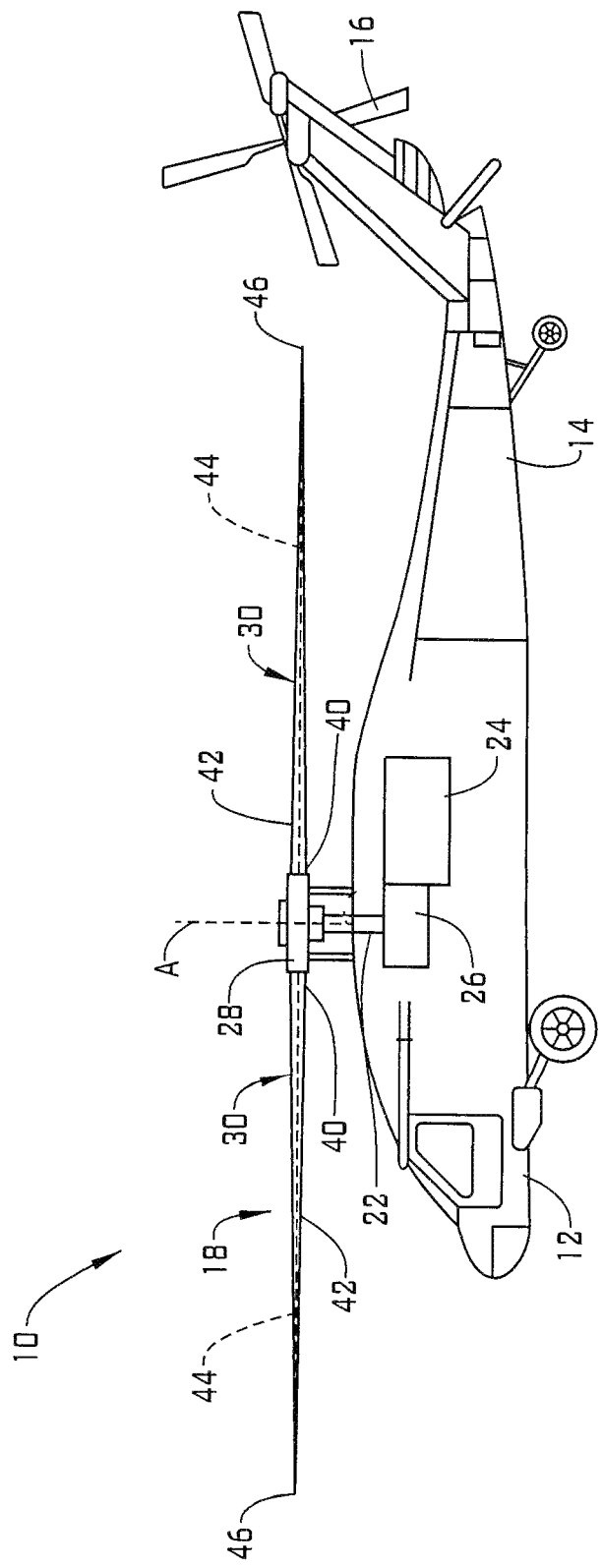
FIG. 1 depicts a rotary wing aircraft including a dual flex-beam assembly, in accordance with an aspect of an exemplary embodiment.

Shown in FIG. 1 is a schematic view of an embodiment of an aircraft, in this embodiment a helicopter 10. The helicopter 10 includes an airframe 12 with an extending tail 14 and a tail rotor 16 located thereat. While the embodiment of a helicopter 10 described herein includes an extending tail 14 and tail rotor 16, it is to be appreciated that the disclosure herein may be applied to other types of rotor craft. A main rotor assembly 18 is located at the airframe 12 and rotates about a main rotor axis A.

Main rotor assembly 18 is driven by a drive shaft 22 connected to a prime mover, for example, an engine 24 by a gearbox 26. It should be understood that the number and type of prime movers employed by helicopter 10 may vary. Main rotor assembly 18 includes a hub member 28 located at the main rotor axis A and operably connected to drive shaft 22. A plurality of rotor blade assemblies 30 is connected to the hub member 28.

Figure 2:
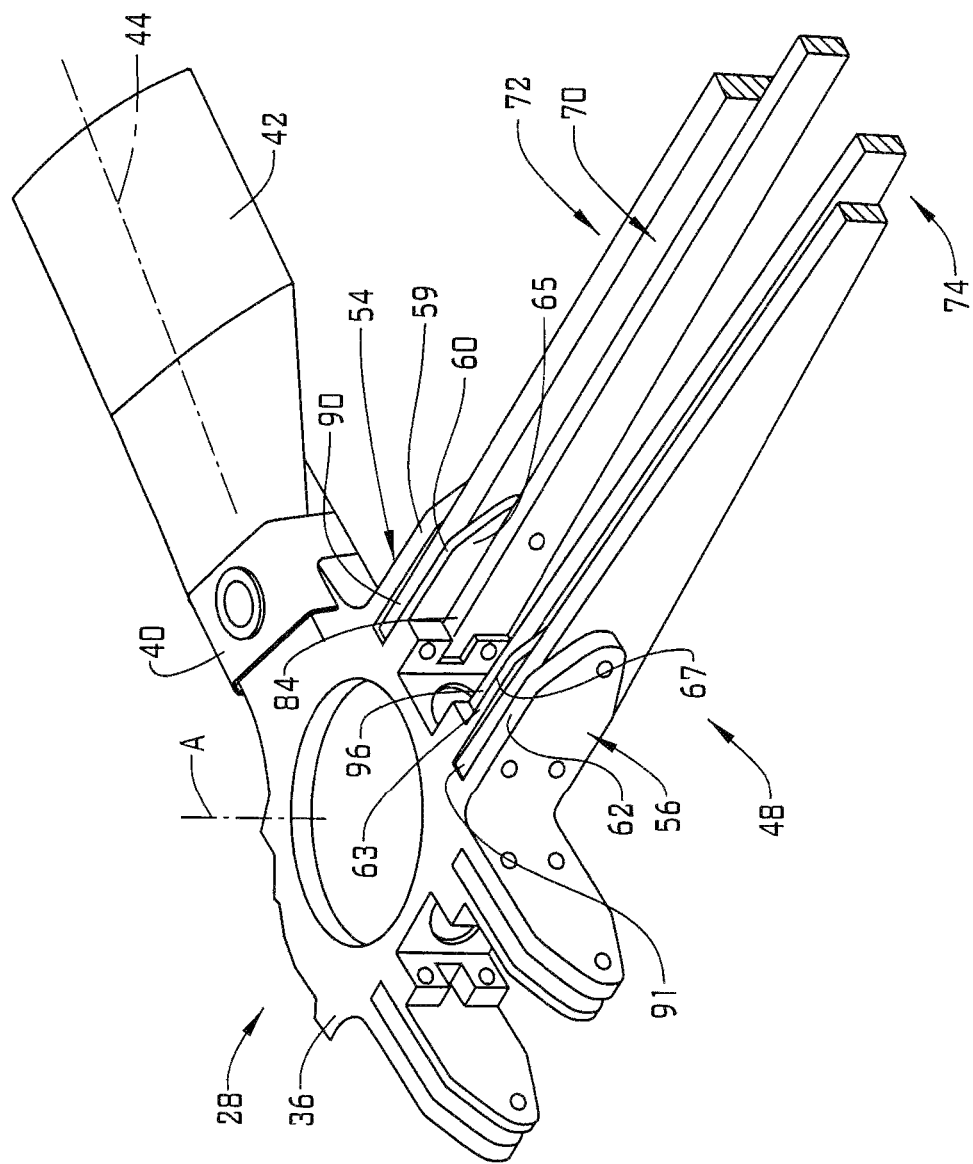
FIG. 2 depicts a hub member of the rotary wing aircraft of FIG. 1 supporting a rotor blade including the dual flex-beam assembly, in accordance with an aspect of an exemplary embodiment.

Referring now to FIG. 2 and with continued reference to FIG. 1, hub member 28 includes a hub plate 36. Each of the plurality of rotor blade assemblies 30 is connected to hub plate 36 on hub member 28 as will be discussed herein. Each rotor blade assembly 30 includes a torque tube 40. A rotor blade 42 has an airfoil-shaped cross section and is secured to torque tube 40. Rotor blade 42 extends radially along a blade axis 44 to a blade tip 46 (FIG. 1) and extends over a flex-beam assembly 48. In some embodiments, torque tube 40 and rotor blade 42 are assembled into a unitary assembly prior to installation over flex-beam assembly 48.

With continued reference to FIG. 2, rotor hub 28 includes a first flex-beam attachment member 54 and a second flex-beam attachment member 56. First flex-beam attachment member 54 includes a first attachment element 59 and a second attachment element 60 spaced one from another by a first gap (not separately labeled). Second flex-beam attachment member 56 includes a third attachment element 62 and a fourth attachment element 63 spaced one from another by a second gap (also not separately labeled). Second attachment element 60 includes an inner surface 65 and fourth attachment element 63 includes an inner surface 67. Flex-beam assembly 48 is mounted to rotor hub 28 through first and second flex-beam attachment members 54 and 56 as will be detailed herein.

Figure 3:
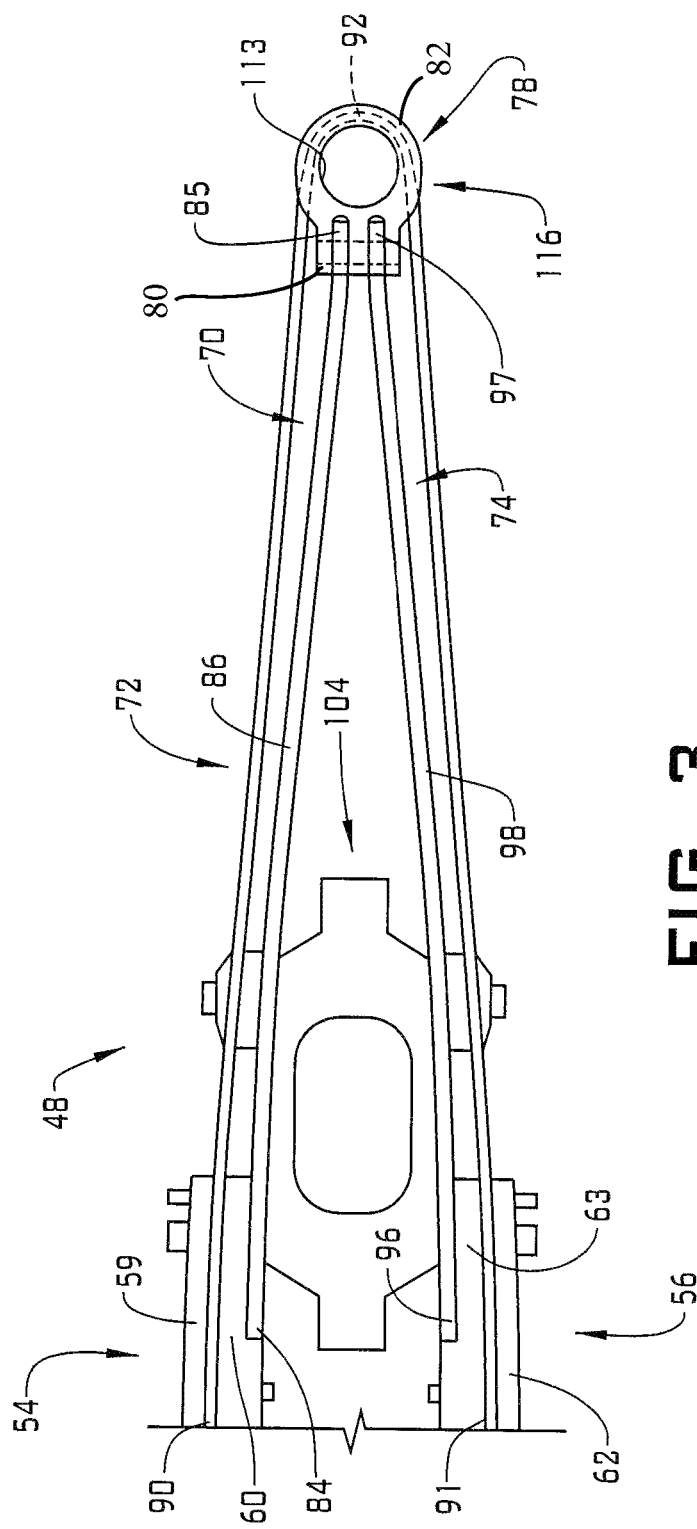
FIG. 3 depicts a top view of a portion of the rotor blade of FIG. 2 showing the dual flex-beam assembly, in accordance with an aspect of an exemplary embodiment.
Figure 4:
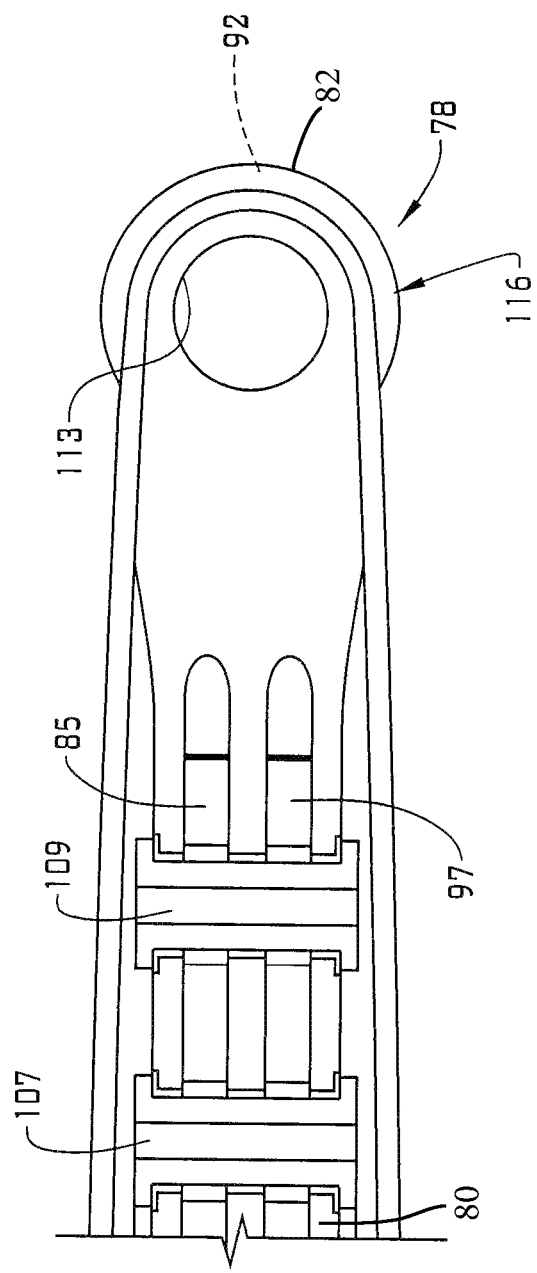
FIG. 4 depicts a dual flex-beam support member of the dual flex-beam assembly of FIG. 3, in accordance with an aspect of an exemplary embodiment.

Reference will now follow to FIGS. 3-4, and with continued reference to FIG. 2, in describing flex-beam assembly 48. Flex beam assembly 48 includes a first flex-beam 70, a second flex-beam 72, and a third flex-beam 74 that extend radially outwardly of rotor hub 28 and connect with a flex-beam support member 78. Flex-beam support member 78 includes an attachment end 80 and a wrapping end 82. First flex-beam 70 includes a first end 84 a second end 85, and an intermediate portion 86. First end 84 is connected to first flex-beam attachment member 54 between first attachment element 59 and second attachment element 60 in the first gap. Second end 85 is connected to attachment end 80 flex-beam support member 78.

In an embodiment, second flex-beam 72 includes a first end portion 90, a second end portion 91 and an intermediate section 92. First end portion 91 is connected to inner surface 65 of second attachment element 63 and second end portion 91 is connected to inner surface 67 of fourth attachment element 63. Intermediate section 92 extend or bends about wrapping end 82 of flex-beam support member 78. Third flex-beam 74 includes a first end section 96, a second end section 97, and an intermediate segment 98. First end section 96 is connected to second flex-beam attachment member 56 between third attachment element 62 and fourth attachment element 63 in the second gap. Second end section 97 is connected to attachment end 80 of flex-beam support member 78.

In an embodiment, a brace or spacer member 104 may be arranged between first flex-beam 70 and third flex-beam 74. A plurality of fasteners (not separately labeled secure first, second, and third flex-beams 70, 72, and 74 to first and second flex-beam attachment members 54 and 56. If so provided, the plurality of fasteners will also connect first, second, and third flex-beams 70, 72, and 74 to spacer member 104. First and third flex-beams 70 and 74 are connected to flex-beam support member 78 with a first fastener 107 and a second fastener 109. First and second fasteners 107 and 109 may be secured with a pre-load.

In an embodiment, flex-beam support member 78 includes an opening 113 that defines a hinge end 116. Hinge end 116 provides a pivot zone for rotor blade 42. That is, rotor blade 42 may be folded about a hinge arranged outboard of hinge end 116. In an embodiment, first flex-beam 70 defines an inner beam and second flex-beam 72 defines an outer beam. Third flex-beam 74 may also define an inner beam. It should be understood that first, second, and third flex-beams 70, 72, and 74 provide a desired support for loads subjected to rotor blade 42 while also accommodating blade fold at hinge end 116.

A pitch control horn (not shown) may be bolted to an inboard end (not separately labeled) of torque tube 40 to connect with a conventional helicopter control system. The pitch horn may also extend inboard of a connection between torque tube 40 and an inboard pitch change bearing (not shown) mounted to spacer 104. The pitch horn may pass through an opening (not separately labeled) in spacer 104 and extend along blade axis 44 to an inside of a drive shaft 22. In this manner, pitch control rods (not shown) inside drive shaft 22 can impart pitch motions on torque tube 40.

The terms "about" and "substantially" are intended to include the degree of error associated with measurement of the particular quantity based upon the equipment available at the time of filing the application. For example, "about" and/or "substantially" can include a range of ±8% or 5%, or 2% of a given value.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A rotor blade system for a rotary wing aircraft comprising:
   a rotor hub including a first flex-beam attachment member and a second flex-beam attachment member;
   a rotor blade which generates lift for the rotor blade system; and
   a flex-beam assembly supporting the rotor blade system and connected to the rotor hub, the flex-beam assembly comprising:
      a flex-beam support member spaced from the rotor hub and having an attachment end and a wrapping end, the rotor blade rotatably attached to and extending from the flex-beam support member;
      a first flex-beam including a first end, a second end and an intermediate portion, the first end of the first flex-beam being connected at the first flex-beam attachment member and the second end of the first flex-beam being connected to the attachment end of the flex-beam support member; and
      a second flex-beam including first end portion, a second end portion and an intermediate section, the first end portion of the second flex-beam being connected at the first flex-beam attachment member, the second end portion of the second flex-beam being connected at the second flex-beam attachment member and the intermediate section extending about the wrapping end of the flex-beam support member.

2. The rotor blade system according to claim 1, further comprising: a third flex-beam including a first end section, a second end section and an intermediate segment, the first end section of the third flex-beam being connected at the second flex-beam attachment member and the second end section of the third flex-beam being connected at the attachment end of the flex-beam support.

3. The rotor blade system according to claim 1, wherein the first flex-beam defines an inner beam and the second flex-beam defines an outer beam.

4. The rotor blade system according to claim 1, wherein the first flex-beam is connected to the flex-beam support member with at least one fastener.

5. The rotor blade system according to claim 1, wherein the flex-beam support member defines a hinge end having an opening between the attachment end and a wrapping end, the rotor blade being attached to a hinged end.

6. The rotor blade system according to claim 5, further comprising: a torque tube mounted to at least one of the first and second flex-beams.

7. The rotor blade system according to claim 6, wherein the torque tube is included within the rotor blade, which is arranged at the hinge end.

8. The rotor blade system according to claim 1, wherein the first flex-beam attachment member includes a first attachment element and a second attachment element spaced from the first attachment element by a gap, wherein the first end of the first flex-beam is connected between the first and second attachment elements in the gap, and the first end portion of the second flex-beam is connected to an inner surface of the second attachment element.

9. A rotary wing aircraft comprising:
   a fuselage;
   at least one prime mover supported in the fuselage;
   a rotor assembly operatively connected to the at least one prime mover, the rotor assembly including a rotor hub including a first flex-beam attachment member, a second flex-beam attachment member, and a rotor blade system mounted to the rotor hub, the rotor blade system including a flex-beam assembly supporting the rotor blade system and connected to the rotor hub, the flex-beam assembly comprising:
      a flex-beam support member spaced from the rotor hub and having an attachment end and a wrapping end, a rotor blade being rotatably attached to and extending from the flex-beam support member;
      a first flex-beam including a first end, a second end and an intermediate portion, the first end being connected at the first flex-beam attachment member and the second end being connected to the attachment end of the flex-beam support member; and
      a second flex-beam including first end portion, a second end portion and an intermediate section, the first end portion being connected at the first flex-beam attachment member, the second end portions being connected at the second flex-beam attachment member and the intermediate section extending about the wrapping end of the flex-beam support member.

10. The rotary wing aircraft according to claim 9, further comprising: a third flex-beam including a first end section, a second end section and an intermediate segment, the first end section being connected at the second flex-beam attachment member and the second end section being connected at the attachment end of the flex-beam support.

11. The rotary wing aircraft according to claim 9, wherein the first flex-beam defines an inner beam and the second flex-beam defines an outer beam.

12. The rotary wing aircraft according to claim 9, wherein the first flex-beam is connected to the flex-beam support member with at least one fastener.

13. The rotary wing aircraft according to claim 9, wherein the flex-beam support member defines a hinged end having an opening between the attachment end and a wrapping end, the rotor blade being attached to the hinged end.

14. The rotary wing aircraft according to claim 13, further comprising: a torque tube extending about the flex-beam assembly.

15. The rotary wing aircraft according to claim 14, wherein the rotor blade system is connected to the torque tube, the rotor blade system being configured to pivot about the hinge end.

* * * * *